No. 674,572. Patented May 21, 1901.
M. M. BROWN.
TIRE VALVE.
(Application filed June 25, 1898. Renewed Nov. 27, 1900.)
(No Model.)
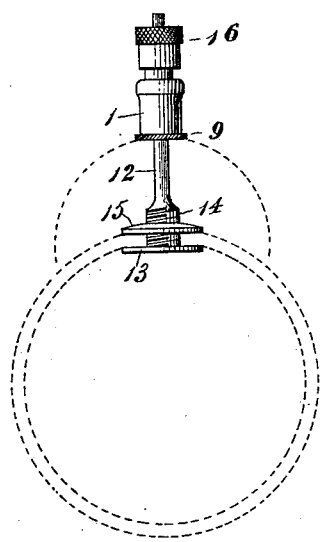
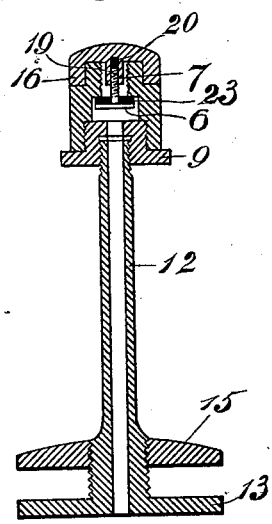
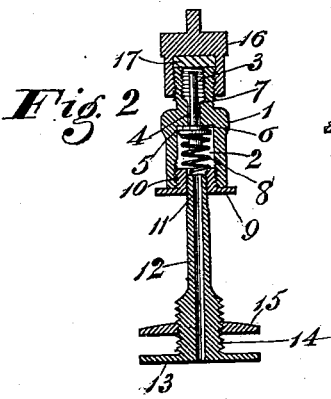
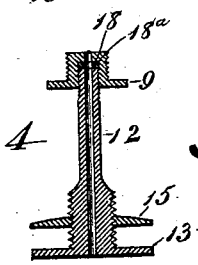
Witnesses
E. E. Overholt
A. G. Miller
M. M. Brown
Inventor
By W. T. Fitzgerald
Attorneys

UNITED STATES PATENT OFFICE.

MILO M. BROWN, OF BLOOMDALE, OHIO.

TIRE-VALVE.

SPECIFICATION forming part of Letters Patent No. 674,572, dated May 21, 1901.

Application filed June 25, 1898. Renewed November 27, 1900. Serial No. 37,924. (No model.)

*To all whom it may concern:*

Be it known that I, MILO M. BROWN, a citizen of the United States, residing at Bloomdale, in the county of Wood and State of Ohio, have invented certain new and useful Improvements in Tire-Valves; and I do hereby declare the following to be a full, clear, and exact description of the invention, such as will enable others skilled in the art to which it appertains to make and use the same.

My invention relates to improvements in valves, and more particularly to that character of valve designed especially as a tire-valve by means of which the tire upon a bicycle or wheel may be readily inflated, with the assurance that the air thus introduced will be retained within the tire by said valve.

Among the objects of my invention is to provide a tire-valve of such proportions, and especially that portion thereof passing through the rim of the wheel, that only a very small hole need be bored in the rim, thus avoiding the necessity of weakening the rim by providing a hole of large diameter, as is now the common practice.

A further object, among others, is to provide a tire-valve of reliable efficiency and great simplicity which will present a neat and attractive appearance, thus adding to instead of detracting from the beauty of the wheel to which it is applied.

My invention therefore consists in certain novel combinations and constructions of parts which will be hereinafter fully described and claimed, reference being had to the accompanying drawings, in which—

Figure 1 is a side elevation of my valve, showing its relative location with respect to the tire and rim by dotted lines representing said parts. Fig. 2 is a longitudinal central section of my valve complete on a slightly-enlarged scale from that employed in Fig. 1. Fig. 3 is a detail in section of the valve proper. Fig. 4 is a central section showing a modified construction for the removable base of the valve-housing, while Fig. 5 shows a varied means employed to hold the valve proper within its seat, thereby dispensing with the spring to secure such result.

Referring to the several parts of my invention, 1 is the body-section of my tire-valve, which is preferably constructed substantially as shown, thus providing an enlarged chamber 2 in the lower portion and a chamber 3 of less size in the upper end, said chambers being connected by the restricted neck portion 4. The enlarged chamber 2, it will be seen, is provided with the valve-seat 5, against the face of which the disk or head 6, formed upon the valve-stem 7, is brought to bear by means of the coiled spring 8, mounted within the chamber 2 and so disposed that it will bear against the upper side of the removable base 9, said base being firmly seated within the tubular end of the chamber 2, as by screw-threads 10, and is also provided with a central aperture designed to receive the threaded end 11 of the tubular stem 12, the lower end of the latter being provided with the integrally-formed or otherwise attached disk 13, by means of which it is retained within the tube forming the tire, said stem being further provided, near the disk 13, with the threaded section 14, designed to receive the locking-disk 15, by means of which the tubular stem 12 is firmly anchored into engagement with the tire, as will be readily understood. The smaller chamber 3 is entirely inclosed, suitable packing, as 17, being interposed between the upper end of the chamber 3 and the inner face of the housing or cap 16, whereby the escape of the air will be effectually prevented.

In Fig. 4 I have shown the base 9 slightly differently formed from the construction shown in Fig. 2, as an offset or shoulder 18 is formed therein, designed to receive the upper face of the tubular stem 12, a resilient washer or packing 18ᵃ being interposed between them in order to more effectually seal the parts against the escape of the air confined within the tire.

In Fig. 5 I have shown a slightly-modified form of construction, as I am able to dispense with the coiled spring 8 for the purpose of holding the valve-head 6 in coöperation with its seat. In Fig. 5 it will be seen that the valve-stem 7 is extended upward and is provided upon its extreme end with screw-threads 19, designed to be received by a threaded aperture 20, provided in the inner face of the cap or housing 16, the lower edges 21 of said cap being designed in this instance to rest upon the shoulders 22 of the body-section 1, the exterior threads being omitted upon the upper end of the body, and it will be readily apparent that when the cap or housing is turned downward in engagement with the threaded stem 7 it will engage said stem and draw the same upward until the disk 6 is brought firmly to bear against its seat or into close union with the interposed packing or gasket 23, thereby preventing the escape of the air within the tire.

It will be understood that in order to prevent the disk or head 6 from rotating while the cap or housing is rotated said head may be made square or of other angular outline, the opening within the body by which it is received being also similarly shaped.

It will be understood that my improved valve, particularly as shown in Figs. 1 to 4, may be easily separated into seven distinct parts, including the valve and spring, and that the same may be very cheaply and expeditiously manufactured and assembled in their respective operative positions, the anchoring-disks 13 and 15 being brought into engagement with the tire in the usual way by screwing the disk 15 downward into close contact with said tire. After the tubular section has thus been anchored in position a hole of very small diameter may be provided within the rim to receive it, thus obviating the necessity of weakening the rim by providing a larger hole. When the tubular section 12 has been introduced within the hole provided for it in the rim, the extreme threaded end thereof will protrude upward beyond the rim sufficiently to receive the base 9, which being previously screwed into engagement completes the mounting of the valve, which may be operated by any suitable pump after the retaining-cap 16 has been removed, as is usual with valves of this character.

If the form of valve shown in Fig. 5 is used, the chamber accommodating the head thereof may be made of very limited size and much smaller than would be necessary to accommodate the coiled spring 8, thereby still further reducing the size of the valve and rendering it unnecessary for it to appear or extend but very slightly above the surface of the rim.

My improved valve may be made of any suitable material deemed necessary for the purpose, the several parts thereof being cast or forged in the usual manner. It is thought that the base-section 9 shown in Fig. 4 will be found more desirable, inasmuch as the recession and escape of the air around the threaded end of the tubular section 12 is prevented by the packing $18^a$, as will be clearly apparent.

Having thus fully described the construction and operation of my improved valve for pneumatic tires, what I claim as new, and desire to secure by Letters Patent, is—

1. In a tire-valve, the combination of a tubular stem of reduced diameter adapted to pass through the rim of the wheel; a base attached to the free end of said stem; a body having an angular throat and a valve-seat; a valve fitting said seat and having an upwardly-extending threaded stem, and a cap adapted to inclose the upper end of said body and engage said threaded stem, whereby the valve thereon will be drawn upward into engagement with its seat when the cap is screwed home, or released from engagement with its seat when the cap is removed as and for the purpose set forth.

2. A tire-valve having a stem of reduced diameter adapted to pass through the rim of the wheel and having means to secure it to the tire-tube, in combination with a base portion 9 having a threaded aperture provided with a shoulder 18 adapted to receive the threaded end of said stem; a body portion having a valve-seat designed to receive the upwardly-extended exterior threaded portion 10 of said base; a valve carried by said body portion and means to normally hold said valve upward against a seat provided in said body, substantially as described and for the purpose set forth.

In testimony whereof I affix my signature in presence of two witnesses.

MILO M. BROWN.

Witnesses:
CHAS. R. CAMPBELL,
E. D. BLOOM.